Patented Jan. 27, 1931

1,790,102

UNITED STATES PATENT OFFICE

MAX ALBERT KUNZ AND FREIHERR GUIDO von ROSENBERG, OF MANNHEIM, AND EDUARD GOFFERJÉ, OF FRANKFORT-ON-THE-MAIN, GERMANY, ASSIGNORS TO GENERAL ANILINE WORKS, INC., OF NEW YORK, N. Y., A CORPORATION OF DELAWARE

VAT DYESTUFFS OF THE ANTHRAQUINONE SERIES

No Drawing. Application filed August 13, 1927, Serial No. 212,844, and in Germany August 13, 1926.

The present invention relates to new anthraquinone-oxazoles, more particularly to compounds of the general formula:

wherein $C_1$ and $C_2$ belong to an anthraquinone nucleus, A indicates another anthraquinone radical and wherein both anthraquinone nuclei may be substituted or not.

The new compounds are obtainable in a great variety of ways. For example they are formed when amino-anthraquinones which contain a negative substituent such as a hydroxyl-group or a halogen atom in o-position to the amino-group, are condensed with anthraquinone-aldehydes in the presence or absence of solvents and preferably at an elevated temperature. Instead of anthraquinone-aldehydes we may use other anthraquinone derivatives with aldehyde properties for instance anthraquinone-isoxazoles, or anthraquinone-carboxylic acids or compounds reacting like them such as the acid halides, esters and similarly acting compounds.

The new products may also be obtained by condensing anthraquinones containing two negative substituents in o-position to each other with anthraquinone-carboxylic acid amids. A modification of the said way of preparing the new anthraquinone-oxazoles consists in condensing anthraquinone-carbonylamino-anthraquinones which are substituted by hydroxyl groups or other negative substituents in the o-position to the amino group; the said anthraquinone-carbonylamino-anthraquinones may be obtained in a very advantageous manner by condensing an anthraquinone-carboxylic acid halide with an amino-anthraquinone containing a hydroxyl group or other negative substituent in o-position to the amino group, but they may also be prepared in any other suitable way.

The new products are valuable vat dyestuffs which are distinguished by their excellent affinity for the fibre and their great fastness. The shades of the said products may be varied within the widest limits by the presence of further substituents in one or both of the anthraquinone radicles. The products dissolve in concentrated sulfuric acid in most cases with the formation of yellow to orange solutions.

Those products which may be derived from 2.3-amino-hydroxy-, 1.2-amino-hydroxy- and 2.1-amino-hydroxy-anthraquinone and contain an amino group in the 1-position of the anthraquinone radical acting as a substituent in the $\mu$-position of the oxazole nucleus, especially those which correspond to the formulæ

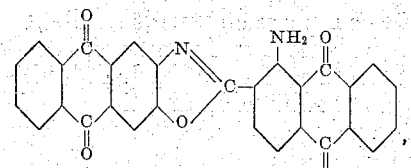

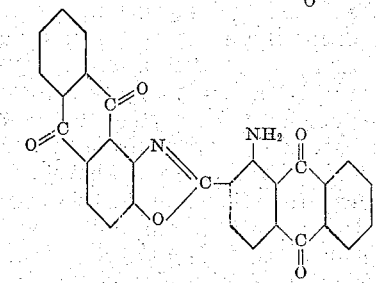

and

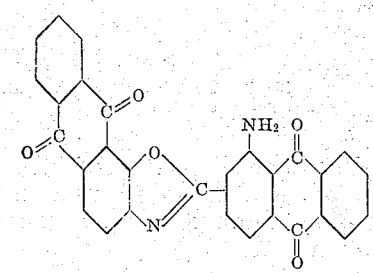

respectively, are of particular value; they dye practically the same shades of excellent fastness and are also very valuable intermediate products for the production of new dyestuffs.

We have further found that, by the action of fuming sulfuric acid on such dyestuffs produced as hereinbefore described, as contain at least one free amino group in alpha-position in one or both of the anthraquinone radicals, products of considerable deeper color are obtained. The action of the fuming sulfuric acid may be considerably accelerated by additions such as sulfur or iodine, and the concentration of the fuming sulfuric acid and the reaction temperature, may be varied within wide limits. It is probable that in this treatment no sulfonation or condensation takes place, but that a hydroxyl group is formed in the para-position to the amino group; accordingly the product obtained for example from the dyestuff of the formula

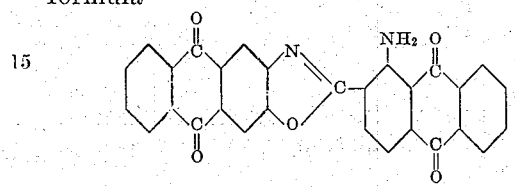

is considered to correspond to the formula

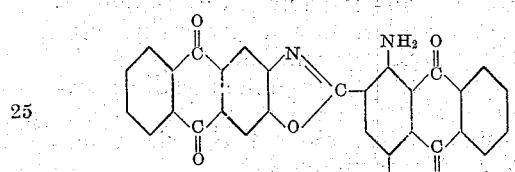

The said new products furnish violet to blue dyeings of excellent fastness on vegetable fibres from the alkaline hydrosulphite vat. They are not soluble in, and their shades are not altered by aqueous alkalis. They dissolve in concentrated sulfuric acid in most cases with an orange coloration.

On treating these new dyestuffs containing hydroxyl groups with alkylating agents, as for example with p-toluene-sulfonic acid methyl ester, the hydroxyl group is etherified and other new dyestuffs with excellent tinctorial properties are obtained. These alkyl ethers are rather similar in their properties to the aforesaid compounds with free hydroxyl groups. Their shades are in most cases more violet and their fastness to chlorine is still better.

Those anthraquinone-oxazoles which have been mentioned above as being of particular value, are best suitable also for the treatment with fuming sulfuric acid with or without subsequent alkylation.

The following examples will further illustrate the nature of the said invention which however is not limited thereto. The parts are by weight.

*Example 1*

5 parts of 2.3-amino-hydroxy-anthraquinone—obtainable by treating 2.3-brom-hydroxy-anthraquinone with concentrated ammonia at 130° C. for 5 hours—are intimately mixed with 7 parts of anthraquinone-2-aldehyde, and heated—for example for 1½ hours at 250° C.—until a sample no longer gives the color reaction of 2.3-amino-hydroxy-anthraquinone with alkalis. After cooling, the greyish-brown reaction product corresponding to the formula

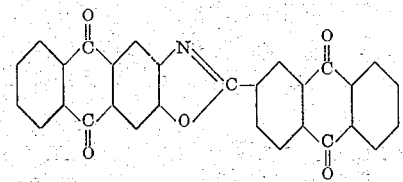

is crushed and is purified by recrystallization from nitrobenzene. It is then in the form of yellow crystals, which dissolve to a reddish-brown solution in sulfuric acid. The hydrosulphite vat is deep green in color and dyes intensively on cotton. On oxidation, the blackish-green color changes to a light yellow.

*Example 2*

2 parts of 2-amino-1-hydroxy-anthraquinone are heated to boiling with 3 parts of azomethine (prepared for example from 1-amino-anthraquinone-2-aldehyde and aniline) in 25 parts of nitrobenzene until unaltered 2-amino-1-hydroxy-anthraquinone can no longer be detected. The reaction proceeds according to the following equation:

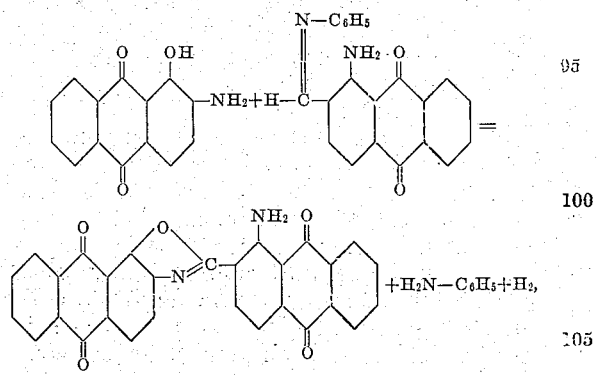

the hydrogen formed being consumed by reduction of the nitrobenzene. After cooling, the dyestuff which has separated out as brownish-red needles with a coppery lustre, is filtered by suction and washed with nitrobenzene until the washing liquid exhibits merely a slight tinge. The nearly pure dyestuff which corresponds to the formula

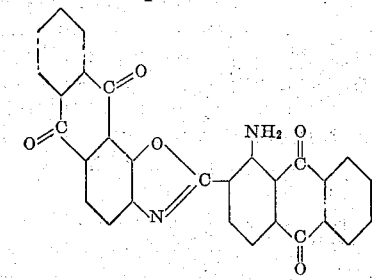

may be further purified by recrystallization from nitrobenzene, and then dissolves to a yellow solution in sulfuric acid, from which solution it is thrown down by water in the form of red flakes with a bluish tinge. It gives deep cherry red dyeings on cotton, from a vat of the same color. Oxidation changes the shade to a very fast red with a bluish tinge.

Example 3

3 parts of 3-amino-alizarine and 4 parts of 1-amino-anthraquinone-2-aldehyde are heated in 40 parts of boiling nitrobenzene until the reaction mixture no longer contains any detectable amount of matter which is soluble in alkali. After cooling, the solid product is filtered by suction and washed with nitrobenzene until the washing liquid shows merely a slight tinge. The residue is a reddish-brown dyestuff which corresponds to the formula

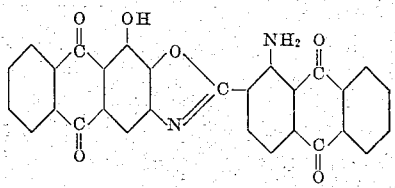

and dissolves to an orange solution in sulfuric acid and is precipitated therefrom by water in the form of brownish-red flakes, the color of which changes to violet under the action of alkali. If the dyestuff be alkylated, for example by treating the same, in solution or suspension in o-dichlorbenzene, with p-toluene-sulfonic acid methyl ester, a red product is obtained which is fast to alkali, dissolves to an orange solution in sulfuric acid (from which it is precipitated in the form of red flakes by water) and gives dark colored dyeings on cotton from a deep violet vat (with an olive tinge), the color changing, on oxidation to a powerful and very fast red.

Example 4

1 part of 1-amino-anthraquinone-2-carboxylic acid chlorid and 1 part of 1-amino-2-hydroxy-anthraquinone are heated in 10 parts of nitrobenzene for an hour at 120° to 130° C. The temperature is then gradually raised to boiling heat and is maintained thereat until the formation of dyestuff ceases to increase. After cooling, the dyestuff is filtered by suction and can be further purified by recrystalization from nitro-benzene, separating out in the form of reddish-brown crystals which correspond to the formula

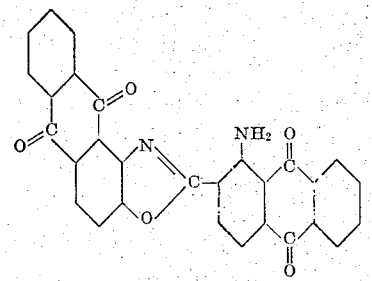

and dissolve to an olive solution in sulfuric acid. The dyeings on cotton from the red hydrosulphite vat (with a violet tinge) are of this latter color, which changes, on oxidation, to a very fast, blue-tinged red.

Example 5

3 parts of the condensation product from 1.3-dibrom-2-amino-anthraquinone with anthraquinone-2-carboxylic acid chlorid, of the formula:

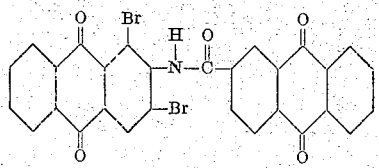

are triturated with 5 parts of naphthalene and 2 parts of calcined soda, and are heated to boiling for several hours, the mixture being kept stirred. The resulting melt is freed from naphthalene by extraction with benzene, sodium bromide and carbonate are extracted with water. The residual product may be further purified by recrystallization, for example from nitrobenzene. Yellow crystals corresponding probably to the formula

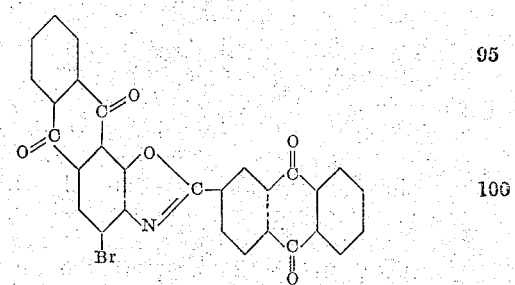

are obtained which dissolve to a yellow solution in sulfuric acid. The violet-brown vat dyes well on cotton, the color changing to light yellow on oxidation.

Example 6

1 part of the condensation product from 2.3-brom-amino-anthraquinone and 1.2-amino-anthraquinone-carboxylic acid chloride of the formula:

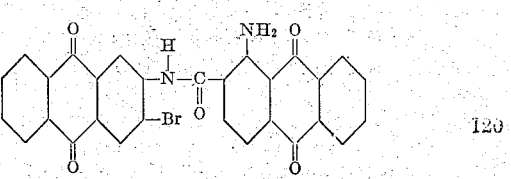

is stirred and heated to boiling, while stirring, with 1.5 parts of naphthalene, 0.6 part of calcined soda, 0.01 part of copper acetate and 0.01 part of copper bronze, until halogen can no longer be detected in a sample of the product boiled with alcohol and water. The melt is treated as described in Example 5.

The dyestuff which corresponds to the formula

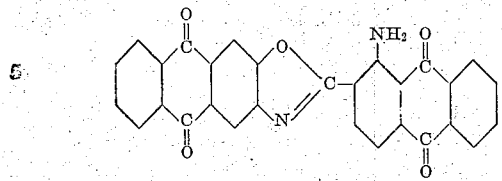

may be further purified by recrystallization from solvents of high boiling point, and it then dissolves to an olive-brown solution in sulfuric acid. Cotton is dyed a deep olive black in the vat, the color changing, on oxidation, to an exceedingly fast red with bluish tinge.

Example 7

10 parts of anthraquinone-1.2-isoxazole and 9 parts of 2.3-amino-hydroxy-anthraquinone are heated to boiling with 150 parts of trichlorbenzene until unaltered initial material can no longer be detected. The resulting dyestuff is filtered by suction after cooling. The resulting dyestuff is filtered by suction after cooling. It can be purified by recrystallization from nitrobenzene, and is identical with the product described in Example 6.

Example 8

13.5 parts of 1.2-aminoanthraquinone-carboxylic acid are suspended in 150 parts of nitrobenzene and heated for about 2 hours with 7 parts of thionyl chlorid at 70° C. A dry current of air is then blown through the reaction mixture at about 100° C., which removes the excess of thionyl chlorid, the sulfur dioxid and the hydrogen chlorid. After the addition of 12 parts of 2.3-amino-hydroxy-anthraquinone, the mixture is then slowly heated to the boil, and after a further addition of 2 parts of para-toluene-sulfonic acid kept boiling, until a test-portion of the reaction product no longer shows a change in color on the addition of alkali. The dyestuff is then filtered off, while hot, by suction and washed with nitrobenzene. It is identical with the product described in Example 6.

Example 9

1 part of the dyestuff obtained in the above described manner from 2.3-amino-hydroxy-anthraquinone and 1-amino-anthraquinone-2-aldehyde is stirred into 10 parts of fuming sulfuric acid (containing 75 per cent of anhydride) and is left for about 50 hours at room temperature until the dyestuff, precipitated from a sample by ice, separates out in the form of pure blue flakes, and no further change is effected by the continuance of the treatment. The solution—after dilution with sulfuric acid mono-hydrate if necessary—is then stirred into ice, the dyestuff being filtered by suction and washed until neutral. It can be completely purified by recrystallization from organic solvents of high boiling point, in which it dissolves to a blue solution. The product corresponds probably to the formula

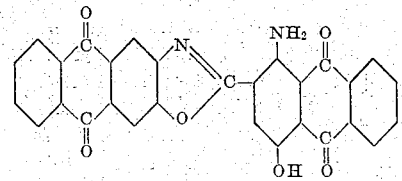

Its solution in concentrated sulfuric acid is orange-yellow in color.

The dyeings from the blackish-violet vat are dark in color, changing to blue on oxidation.

In order to methylate the dyestuff, 1 part thereof is suspended in 20 parts of o-dichlorbenzene and is boiled and stirred with 1 part of p-toluene-sulfonic acid methyl ester and 1 part of carbonate of potash until the initially blue solution has become violet and no further change of shade occurs. After cooling, filtering by suction and washing with alcohol and then with water, a violet product is left, which can be recrystallized from solvents of high boiling point and dissolves to an orange solution in concentrated sulfuric acid. The dyeings from the brownish-red vat change to an exceedingly fast violet on oxidation.

Example 10

1 part of the dyestuff obtainable according to Example 4 is stirred into 8 parts of fuming sulfuric acid containing 50 per cent of anhydride. After adding 0.1 part of iodine, the solution is left to stand at room temperature until a sample deposits blue flakes on precipitation with ice. The further treatment is the same as in Example 9.

The dyestuff disolves to an orange solution in concentrated sulfuric acid. The dyeings from the violet vat turn blue on oxidation. A violet dyestuff is obtained by methylating as in Example 9.

Example 11

1 part of the dyestuff prepared in the aforedescribed manner from 1 molecular proportion of o-diamino-anthraflavic acid (obtainable by nitrating anthraflavic acid and reduction) and 2 molecular proportions of 1-amino-2-anthraquinone-aldehyde, which furnishes red dyeings with a bluish tinge, is stirred at 50° C. with 10 parts of fuming sulfuric acid containing 65 per cent of anhydride, and 0.1 part of sulfur, until a sample gives a precipitate of dark blue flakes on addition of ice. The further treatment is the same as in Example 9. A dark blue product is obtained which is considered to correspond to the formula

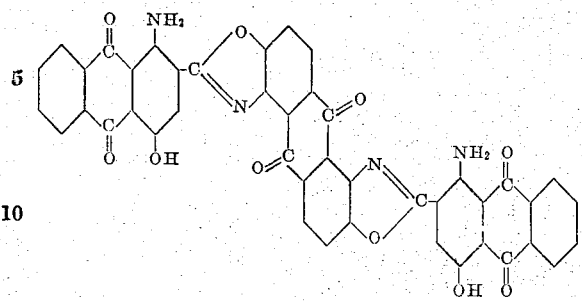

and dissolves to an orange-brown solution in concentrated sulfuric acid. The color of the dyeings from the dark vat becomes dark blue on oxidation.

What we claim is:

1. As new articles of manufacture, anthraquinone-oxazoles containing another anthraquinone radicle as a substituent in the μ-position of the oxazole ring, which products correspond to the general formula

wherein $C_1$ and $C_2$ belong to an anthraquinone nucleus and A indicates another anthraquinone radical and wherein both anthraquinone nuclei may be substituted or not.

2. As new articles of manufacture, anthraquinone-oxazoles derived from an anthraquinone derivative selected from the group consisting of 2.3-amino-hydroxy-, 1.2-amino-hydroxy- and 2.1-amino-hydroxy-anthraquinone, and containing another anthraquinone radicle as a substituent attached in its β-position to the μ-position of the oxazole ring, which products correspond to the general formula

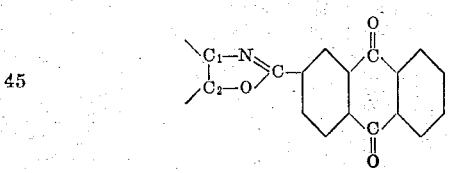

wherein $C_1$ and $C_2$ belong to an anthraquinone nucleus and wherein both anthraquinone nuclei may be substituted or not.

3. As new articles of manufacture, anthraquinone-oxazoles derived from an anthraquinone derivative selected from the group consisting of 2.3-amino-hydroxy-, 1.2-amino-hydroxy- and 2.1-amino-hydroxy-anthraquinone, and containing another anthraquinone radicle as a substituent in the μ-position of the oxazole ring, which products correspond to the general formula:

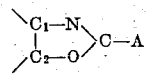

wherein A indicates another anthraquinone radical and wherein at least one of the anthraquinone nuclei contains an amino group in alpha-position and both anthraquinone nuclei may be further substituted or not.

4. As new articles of manufacture, vat dyestuffs which dye cotton fast violet to blue shades and are considered to correspond to the general formula

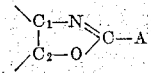

wherein $C_1$ and $C_2$ belong to an anthraquinone nucleus and A indicates another anthraquinone radical and wherein at least one of the anthraquinone nuclei contains an amino group in alpha-position and an O—R group in para-position thereto, R indicating hydrogen or an alkyl group, both anthraquinone nuclei being further substituted or not.

5. As new articles of manufacture, vat dyestuffs which dye cotton fast violet to blue shades and are considered to correspond to the general formula

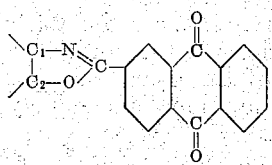

wherein $C_1$ and $C_2$ belong to an anthraquinone nucleus containing another anthraquinone radicle as a substituent attached in its β-position to the μ-position of the oxazole ring and wherein at least one of the anthraquinone nuclei contains an amino group in alpha-position and an O—R group in para-position thereto, R indicating hydrogen or an alkyl group, both anthraquinone nuclei being further substituted or not.

6. As new articles of manufacture, vat dyestuffs which dye cotton fast violet to blue shades and are considered to correspond to the general formula

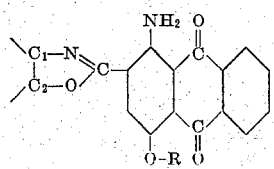

wherein $C_1$ and $C_2$ belong to an anthraquinone nucleus and containing an α-amino anthraquinone radicle attached in the ortho-position to the amino group to the μ-position of the oxazole ring and substituted in the para-position to the amino group by the O—R group in which R indicates hydrogen or an alkyl group.

7. As new articles of manufacture, vat dyestuffs which are considered to correspond to the general formula

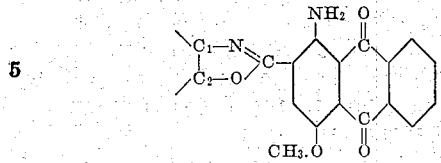

wherein $C_1$ and $C_2$ belong to an anthraquinone nucleus.

8. As new articles of manufacture, anthraquinone-oxazoles derived from an anthraquinone derivative selected from the group consisting of 2.3-amino-hydroxy-, 1.2-amino-hydroxy- and 2.1-amino-hydroxy-anthraquinone which products are considered to correspond to the general formula

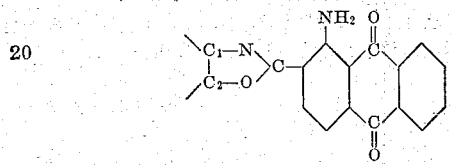

wherein $C_1$ and $C_2$ belong to an anthraquinone nucleus and contain the alpha-aminoanthraquinone radicle attached in the ortho-position to the amino group to the $\mu$-position of the oxazole ring, and wherein both anthraquinone nuclei may be further substituted.

In testimony whereof we have hereunto set our hands.

MAX ALBERT KUNZ.
FREIHERR GUIDO von ROSENBERG.
EDUARD GOFFERJÉ.